United States Patent
Lee et al.

(10) Patent No.: US 11,284,444 B2
(45) Date of Patent: Mar. 22, 2022

(54) METHOD AND APPARATUS FOR TRANSMITTING AND RECEIVING SIGNALS IN WIRELESS COMMUNICATION SYSTEM

(71) Applicant: SAMSUNG ELECTRONICS CO., LTD., Suwon-si (KR)

(72) Inventors: Jonghyeuk Lee, Suwon-si (KR); Hyuncheol Kim, Suwon-si (KR); Soongyoon Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 89 days.

(21) Appl. No.: 16/772,963

(22) PCT Filed: Dec. 14, 2018

(86) PCT No.: PCT/KR2018/015913
§ 371 (c)(1),
(2) Date: Jun. 15, 2020

(87) PCT Pub. No.: WO2019/117665
PCT Pub. Date: Jun. 20, 2019

(65) Prior Publication Data
US 2021/0168871 A1    Jun. 3, 2021

(30) Foreign Application Priority Data
Dec. 14, 2017    (KR) .................. 10-2017-0172505

(51) Int. Cl.
*H04W 74/08*    (2009.01)
*H04W 56/00*    (2009.01)
(Continued)

(52) U.S. Cl.
CPC ....... *H04W 74/0833* (2013.01); *H04L 7/0033* (2013.01); *H04L 7/10* (2013.01); *H04W 56/0045* (2013.01); *H04W 88/08* (2013.01)

(58) Field of Classification Search
CPC .......... H04W 74/0833; H04W 56/0045; H04L 7/0033; H04L 7/10
See application file for complete search history.

(56) References Cited

U.S. PATENT DOCUMENTS 8,165,106 B2    4/2012   Yang et al.
8,717,972 B2    5/2014   Cheng et al.
(Continued)

FOREIGN PATENT DOCUMENTS

KR    10-1371043        3/2014
KR    10-2015-0010612   1/2015
(Continued)

OTHER PUBLICATIONS

Extended Search Report dated Dec. 1, 2020 in counterpart European Patent Application No. 18887709.6.
(Continued)

*Primary Examiner* — Redentor Pasia
(74) *Attorney, Agent, or Firm* — Nixon & Vanderhye, P.C.

(57) ABSTRACT

The present disclosure relates to a method and apparatus for transmitting and receiving signals in a wireless communication system. According to an embodiment of the present disclosure, random access signals including preamble sequences transmitted from a user equipment (UE) may be detected during a plurality of observation periods. A temporary timing advance (TA) value may be determined based on a preamble sequence of a random access signal having greater signal strength among the plurality of random access signals detected in the plurality of observation periods. A final TA value may be acquired based on the temporary TA value according to a result of comparison between the strengths of the random access signals received in the plurality of observation periods and a preset threshold value.
(Continued)

A random access response signal including the final TA value may be transmitted to the UE.

15 Claims, 12 Drawing Sheets

(51) Int. Cl.
*H04L 7/10* (2006.01)
*H04L 7/00* (2006.01)
*H04W 88/08* (2009.01)

(56) References Cited

U.S. PATENT DOCUMENTS

| | | | |
|---|---|---|---|
| 8,868,061 | B2 | 10/2014 | Zhang et al. |
| 9,253,775 | B2 | 2/2016 | Li et al. |
| 10,321,274 | B2 | 6/2019 | Kim et al. |
| 10,362,599 | B2 | 7/2019 | Choi et al. |
| 2011/0103499 | A1 | 5/2011 | Cheng et al. |
| 2012/0224515 | A1 | 9/2012 | Nakayama et al. |
| 2013/0010711 | A1* | 1/2013 | Larsson ............ H04W 56/0045 370/329 |
| 2015/0131426 | A1 | 5/2015 | Wan |
| 2015/0146635 | A1* | 5/2015 | Filipovich ......... H04W 74/0833 370/329 |
| 2015/0189675 | A1* | 7/2015 | Feuersaenger .... H04W 74/0833 370/329 |
| 2017/0273015 | A1 | 9/2017 | Kim et al. |
| 2018/0139025 | A1* | 5/2018 | Rico Alvarino .. H04W 56/0055 |
| 2018/0176905 | A1* | 6/2018 | Li ........................ H04W 72/085 |
| 2018/0235013 | A1* | 8/2018 | Jung ................. H04W 74/0833 |
| 2019/0028942 | A1* | 1/2019 | Tang .................. H04W 74/002 |
| 2019/0159149 | A1* | 5/2019 | Ryu .................. H04W 56/0045 |
| 2019/0268124 | A1* | 8/2019 | Luo ........................ H04L 5/0055 |
| 2019/0281564 | A1 | 9/2019 | Yang et al. |
| 2019/0364520 | A1* | 11/2019 | Kazmi .................... H04W 8/22 |
| 2020/0314909 | A1* | 10/2020 | Irukulapati ....... H04W 74/0833 |

FOREIGN PATENT DOCUMENTS

| | | |
|---|---|---|
| KR | 10-2016-0051789 | 5/2016 |
| KR | 10-2017-0054985 | 5/2017 |
| KR | 10-2017-0090957 | 8/2017 |
| WO | 2018/088640 | 5/2018 |

OTHER PUBLICATIONS

Search Report dated Mar. 7, 2019 in counterpart International Patent Application No. PCT/KR2018/015913 and English-language machine translation.
Written Opinion dated Mar. 7, 2019 in counterpart International Patent Application No. PCT/KR2018/015913 and English-language machine translation.
Thanh-Hai Ngo et al., "Using Timing Advance to Support Proximity Discovery in Network-assisted D2D Communication," 2015 Seventh International Conference on Ubiquitous and Future Networks, Jul. 7, 2015.

* cited by examiner

METHOD AND APPARATUS FOR TRANSMITTING AND RECEIVING SIGNALS IN WIRELESS COMMUNICATION SYSTEM

This application is the U.S. national phase of International Application No. PCT/KR2018/015913 filed 14 Dec. 2018, which designated the U.S. and claims priority to KR Patent Application No. 10-2017-0172505 filed 14 Dec. 2017, the entire contents of each of which are hereby incorporated by reference.

TECHNICAL FIELD

The present disclosure relates to a wireless communication system, and more particularly, to a method and apparatus for transmitting and receiving signals in a wireless communication system.

BACKGROUND ART

In a wireless communication system, a user equipment (UE) may set an uplink transmission timing to a time point desired by a base station (BS) through random access and transmit certain data through an uplink. In particular, a $3^{rd}$ Generation Partnership Project Long-Term Evolution (3GPP LTE) system may support communication up to a cell radius of about 100 km in accordance with a preamble format of a defined random access channel. However, as LTE services become widespread and the power and efficiency of apparatuses increase, there is a growing need to support a larger radius. According to a current LTE specification (up to 3GPP Release 14), it is difficult to support communication in an expanded cell with a radius of 100 km or more. Therefore, there is a need for a method capable of expanding a cell radius without departing from a standardized protocol.

As a method of expanding a cell radius, there may be a method of increasing a cell radius by changing a specification so as to increase lengths of a cyclic prefix (CP) and a guard time (GT) of a preamble of a random access channel. However, when a length of a random access signal is increased, the amount of resources to be allocated in a subframe may be increased. In this case, random access causes a reduction in a data transmission amount. Therefore, the method of expanding the cell radius by changing the specification may be inefficient.

DESCRIPTION OF EMBODIMENTS

Technical Problem

The present disclosure provides a method and apparatus for transmitting and receiving signals in a wireless communication system, wherein, when cell coverage is expanded beyond a preset reference distance, a timing advance (TA) value corresponding to a distance between a user equipment (UE) and a base station (BS) is determined through a random access signal transmitted from the UE.

Solution to Problem

The present disclosure relates to a method and apparatus for transmitting and receiving signals in a wireless communication system. According to an aspect of the present disclosure, random access signals including preamble sequences transmitted from a user equipment (UE) may be detected during a plurality of observation periods, a temporary timing advance (TA) value may be determined based on a preamble sequence of a random access signal having greater signal strength among the plurality of random access signals detected in the plurality of observation periods, a final TA value may be acquired based on the temporary TA value according to a result of comparison between the strengths of the random access signals received in the plurality of observation periods and a preset threshold value, and a random access response signal including the final TA value may be transmitted to the UE.

Advantageous Effects of Disclosure

According to the disclosed embodiments, a cell radius capable of covering communication between a base station (BS) and a user equipment (UE) may be expanded only by a process of the BS without changing an operation of the UE with respect to random access defined in a $3^{rd}$ Generation Partnership Project Long-Term Evolution (3GPP LTE) standard.

BEST MODE

Figure 1:
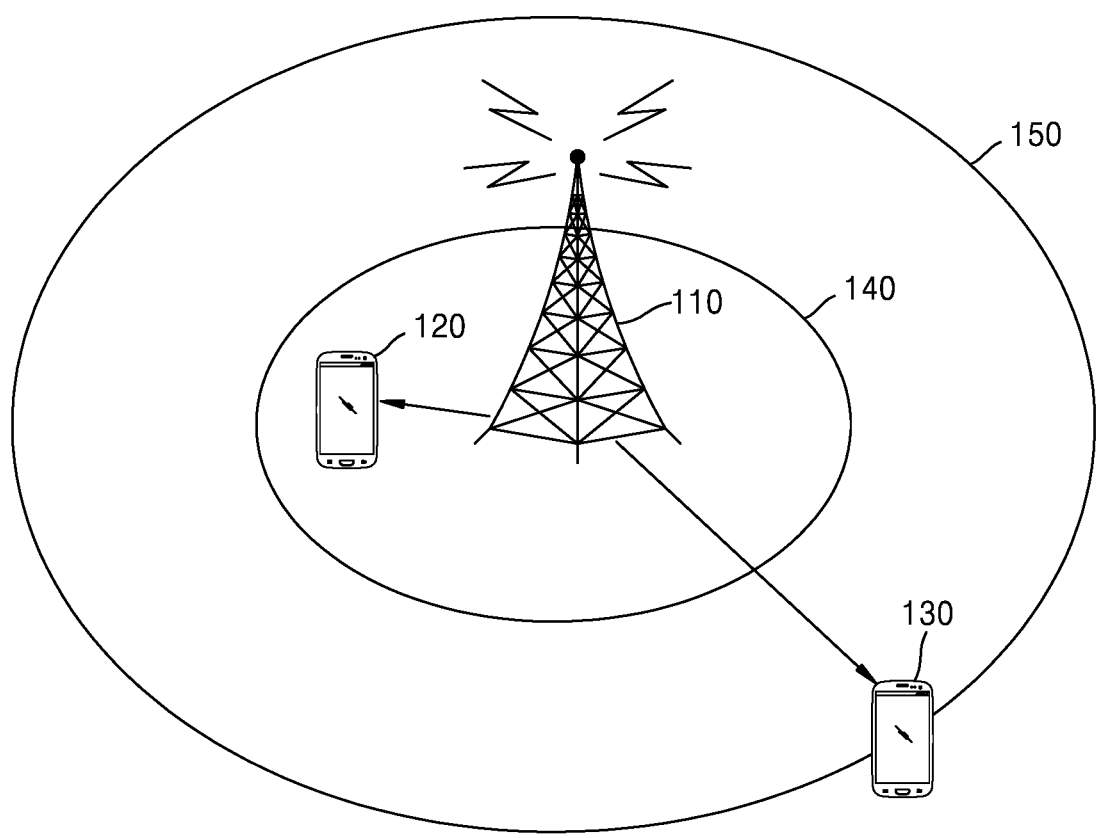
FIG. 1 is a conceptual diagram for describing a wireless communication system for transmitting and receiving a random access signal, according to an embodiment.

According to an embodiment of the present disclosure, a method, performed by a base station (BS), of transmitting and receiving signals in a wireless communication system includes: detecting random access signals including preamble sequences transmitted from a user equipment (UE) during a plurality of observation periods; determining a temporary timing advance (TA) value based on a preamble sequence of a random access signal having greater signal strength among the plurality of random access signals detected in the plurality of observation periods; acquiring a final TA value based on the temporary TA value according to a result of comparison between the strengths of the random access signals received in the plurality of observation periods and a preset threshold value; and transmitting, to the UE, a random access response signal including the final TA value.

The method may further include comparing the strengths of the random access signals received in the plurality of observation periods.

The determining of the temporary TA value may include: when a strength of a random access signal received in a first observation period among the plurality of observation periods is greater than or equal to a strength of a random access signal received in a second observation period, determining, as the temporary TA value, a TA value determined based on the random access signal received in the first observation period; and when the strength of the random access signal received in the first observation period is less than the strength of the random access signal received in the second observation period, determining the temporary TA value by correcting a TA value determined based on the random access signal received in the second observation period, based on a time difference between the first observation period and the second observation period and a length of the preamble sequence.

The acquiring of the final TA value may include: when a ratio of a strength of the random access signal in the first observation period to a strength of the random access signal in the second observation period is greater than or equal to the preset threshold value, acquiring the temporary TA value as the final TA value; and when the ratio of the strength of the random access signal in the first observation period to the strength of the random access signal in the second observation period is less than the preset threshold value, acquiring the final TA value by correcting the temporary TA value by using the length of the preamble sequence.

The preset threshold value may be set according to a ratio of the strengths of the random access signals received in the plurality of observation periods.

The transmitting may include: when the final TA value exceeds a reference TA value preset based on a time difference between the plurality of observation periods, transmitting a difference value between the final TA value and the reference TA value to the UE as the final TA value; and when the final TA value is less than or equal to the reference TA value, transmitting the final TA value to the UE.

The method may further include: determining a synchronization time point, at which a signal received from the UE is demodulated after the transmitting of the final TA value, based on a strength difference between the final TA value and the reference TA value; and demodulating the signal received from the UE after the transmitting of the final TA value, based on the determined synchronization time point.

When the final TA value is greater than the reference TA value, the synchronization time point may be determined as a time point at which the reference TA value is added to a time point of an uplink subframe, and when the final TA value is less than or equal to the reference TA value, the synchronization time point may be determined as the time point of the uplink subframe.

When the BS manages the TA value for each UE, the determining of the synchronization time point may include determining a synchronization time point for each of a plurality of UEs transmitting signals to the BS, and when the BS does not manage the TA value for each UE, the determining of the synchronization time point may include determining the synchronization time point by performing a cyclic redundancy check (CRC) on signals received from the plurality of UEs.

According to an embodiment of the present disclosure, a base station (BS) for transmitting and receiving signals in a wireless communication system includes: at least one processor configured to detect random access signals including preamble sequences transmitted from a user equipment (UE) during a plurality of observation periods, determine a temporary timing advance (TA) value based on a preamble sequence of a random access signal having greater signal strength among the plurality of random access signals detected in the plurality of observation periods, and acquire a final TA value based on the temporary TA value according to a result of comparison between the strengths of the random access signals received in the plurality of observation periods and a preset threshold value; a transceiver configured to transmit, to the UE, a random access response signal including the final TA value; and a memory configured to store the temporary TA value and the final TA value.

MODE OF DISCLOSURE

Hereinafter, technology for a user equipment (UE) to receive broadcast information from a base station (BS) in a wireless communication system will be described. The present disclosure relates to a communication technique for converging, with an Internet of Things (IoT) technology, a $5^{th}$ Generation (5G) communication system for supporting a data transmission rate higher than that of a $4^{th}$ Generation (4G) system or a beyond 4G system, and a system therefor. The present disclosure may be applied to intelligent services based on 5G communication technology and IoT-related technology (e.g., smart home, smart building, smart city, smart car or connected car, health care, digital education, retail, security and safety related services, etc.).

As used herein, the terms referring to broadcast information, the terms referring to control information, the terms related to communication coverage, the terms referring to state changes (e.g. events), the terms referring to network entities, the terms referring to messages, the terms referring to elements of apparatuses, and the like are only examples for convenience of description. Therefore, the present disclosure is not limited by the terms used herein, and other terms having equivalent technical meanings may be used.

For convenience of description, some terms and names defined in a $3^{rd}$ Generation Partnership Project Long-Term Evolution (3GPP LTE) standard may be used. However, the present disclosure is not limited by the terms and names and may be equally applied to systems conforming to other standards.

A wireless communication system has evolved from a system providing a voice-oriented service to a broadband wireless communication system providing high-speed high quality packet data services of communication standards such as High Speed Packet Access (HSPA) of 3GPP, LTE or Evolved Universal Terrestrial Radio Access (E-UTRA), LTE-Advanced (LTE-A), LTE-Pro, High Rate Packet Data (HRPD) of 3GPP2, Ultra Mobile Broadband (UMB), and IEEE 802.16e.

As a representative example of the broadband wireless communication system, the LTE system employs an Orthogonal Frequency Division Multiplexing (OFDM) scheme in downlink (DL) and employs a Single Carrier Frequency Division Multiple Access (SC-FDMA) scheme in uplink (UL). The uplink refers to a radio link through which a terminal (user equipment (UE) or mobile station (MS)) transmits data or a control signal to a base station (eNode B or base station (BS)), and the downlink refers to a radio link through which a base station transmits data or a control signal to a terminal. In the multiple access scheme as described above, data or control information of each user may be distinguished by performing assignment and operation so that time-frequency resources for carrying data or control information for each user do not overlap each other, that is, orthogonality is established.

Future communication systems after LTE, that is, 5G communication systems (or New Radio (NR)) have to be able to freely reflect various requirements of users and service providers. Therefore, services that satisfy various requirements at the same time have to be supported. Services considered for 5G communication systems include Enhanced Mobile Broadband (eMBB), Massive Machine Type Communication (MMTC), and Ultra Reliability Low Latency Communication (URLLC).

Hereinafter, embodiments of the present disclosure, which are applicable to the above-described communication systems, will be described in detail with reference to the accompanying drawings. In the present disclosure, a timing offset estimation scheme and an uplink synchronization scheme in a wide area cell radius are proposed through several embodiments. In the examples of the present disclosure, the operations or the possibility of change are not described in detail for the purpose of facilitating understanding, but timing offset estimation over a range beyond a standard and the realization of an uplink synchronization method using the same may be very widely modified.

FIG. 1 is a conceptual diagram for describing a wireless communication system for transmitting and receiving a random access signal, according to an embodiment.

In the wireless communication system, a UE 120 or 130 may connect to a BS 110 through a random access process and start communication. For example, as a first step for connecting to the BS 110, the UE 120 or 130 may receive a synchronization channel signal and perform downlink synchronization based on the received synchronization channel signal.

After acquiring a radio frame number, a location of a subframe, a cell identifier (ID), and the like through the downlink synchronization process, the UE 120 or 130 may detect a broadcast channel to acquire system information. The system information may include configuration information about a random access channel (RACH). The UE 120 or 130 may complete a process of accessing the wireless communication system by performing uplink synchronization through the RACH.

In a 3GPP LTE standard, an available uplink synchronization range using the RACH is standardized to support a maximum cell radius 140 of about 100 km. Therefore, in addition to an operation of enabling a BS or a UE to support a standard, a separate operation may be required for operating an LTE service in a larger cell radius (e.g., 150).

For compatibility with the UE 120 or 130 conforming to the 3GPP standard in the wireless communication system according to the embodiment, a signal transmitting and receiving method is provided, which is capable of supporting a wide area cell service with a cell radius of about 100 km or more through the process of the BS 110 without changing the operation of the UE 120 or 130. The BS 110 may support a wide area cell service with a cell radius of about 100 km or more by detecting a random access signal including a preamble sequence received from the UE 120 or 130 during a plurality of observation periods and determining a timing advance (TA) value for uplink synchronization based on the random access signal.

The random access signal may be transmitted from the UE 120 or 130 to the BS 110 through the RACH and may be used in the same meaning as the RACH signal. In addition, the TA value is a negative offset on the UE side and may be an offset between a start of a received downlink subframe and an uplink subframe to be transmitted. A timing of signals received from the UEs located at different distances from the BS may be controlled by appropriately controlling the offset for each UE.

A detailed method of supporting a wide area cell service, according to an embodiment, will be described below with reference to FIGS. 3 to 14.

Figure 2:
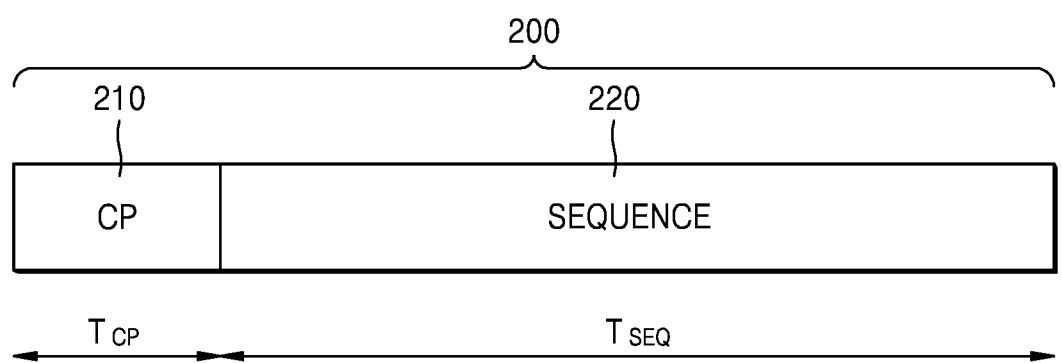
FIG. 2 is a diagram for describing a structure of a preamble sequence transmitted from a user equipment (UE) to a base station (BS) for random access.

FIG. 2 is a diagram for describing a structure of a preamble sequence transmitted from a UE to a BS for random access.

A 3GPP LTE protocol provides various preamble sequences for uplink random access. In an uplink synchronization transmission process, the UE may acquire locations of a radio frame and a subframe through downlink synchronization and determine a location of a channel through which a random access signal is transmitted. Thereafter, the UE may select one of available preamble sequences and transmit the selected preamble sequence to the determined location of the channel.

The BS may detect the transmitted random access signal to determine a TA value for matching uplink synchronization and transmit the determined TA value to the UE. The UE may determine a transmission time point of an uplink data channel signal by using the TA value received from the BS. Therefore, time synchronization may be performed for the uplink data channel.

As an example of the preamble sequence for random access, a Zadoff-Chu (ZC) sequence may be used. However, this is merely an example and the preamble sequence according to the embodiment is not limited to the Zadoff-Chu sequence. The Zadoff-Chu sequence may be defined by Equation 1 below.

$$x_u(n) = e^{-j\frac{\pi u n(n+1)}{N_{zc}}}, 0 \leq n \leq N_{zc} - 1 \qquad \text{[Equation 1]}$$

In Equation 1, u is an index of a root Zadoff-Chu sequence, and Nzc is a prime number indicating the length of the Zadoff-Chu sequence and may be determined to be 839 or 139 in the specification.

Referring to FIG. 2, a preamble sequence 200 for random access may include a cyclic prefix (CP) part 210 and a preamble sequence part 220. The preamble sequence part 220 may be generated by changing a cyclic shift (Nzc) in one Zadoff-Chu sequence. For example, a Zadoff-Chu sequence may be generated by using 24 root Zadoff-Chu sequences and 64 cyclic shift values, and the generated Zadoff-Chu sequence may be used as the preamble sequence part 220.

In addition, the length of the CP part 210 and the length of the preamble sequence part 220 may be variously defined such that the random access signal is transmitted and received according to a variety of cell coverage. A cell radius may be determined by the CP length of the preamble sequence 200 and a guard time (GT) that is an interval to a next subframe.

Table 1 below shows a relationship between a synchronization period of the subframe for random access and a cell radius that is supportable from a reception period of the BS. Five formats are defined in the 3GPP LTE standard. The lengths of the CP part 210 and the preamble sequence part 220 and the GTs may be different from each other.

TABLE 1

Relationship between synchronization period of subframe and cell radius that is supportable from reception period of BS

| PREAMBLE FORMAT | $T_{CP}$ | $T_{SEQ}$ |
|---|---|---|
| 0 | $3168 \cdot T_s$ | $24576 \cdot T_s$ |
| 1 | $21024 \cdot T_s$ | $24576 \cdot T_s$ |

TABLE 1-continued

Relationship between synchronization period of subframe and cell radius that is supportable from reception period of BS

| PREAMBLE FORMAT | $T_{CP}$ | $T_{SEQ}$ |
|---|---|---|
| 2 | $6240 \cdot T_s$ | $2 \cdot 24576 \cdot T_s$ |
| 3 | $21024 \cdot T_s$ | $2 \cdot 24576 \cdot T_s$ |
| 4 (ONLY IN FRAME STRUCTURE TYPE 2) | $448 \cdot T_s$ | $4096 \cdot T_s$ |

Figure 3:
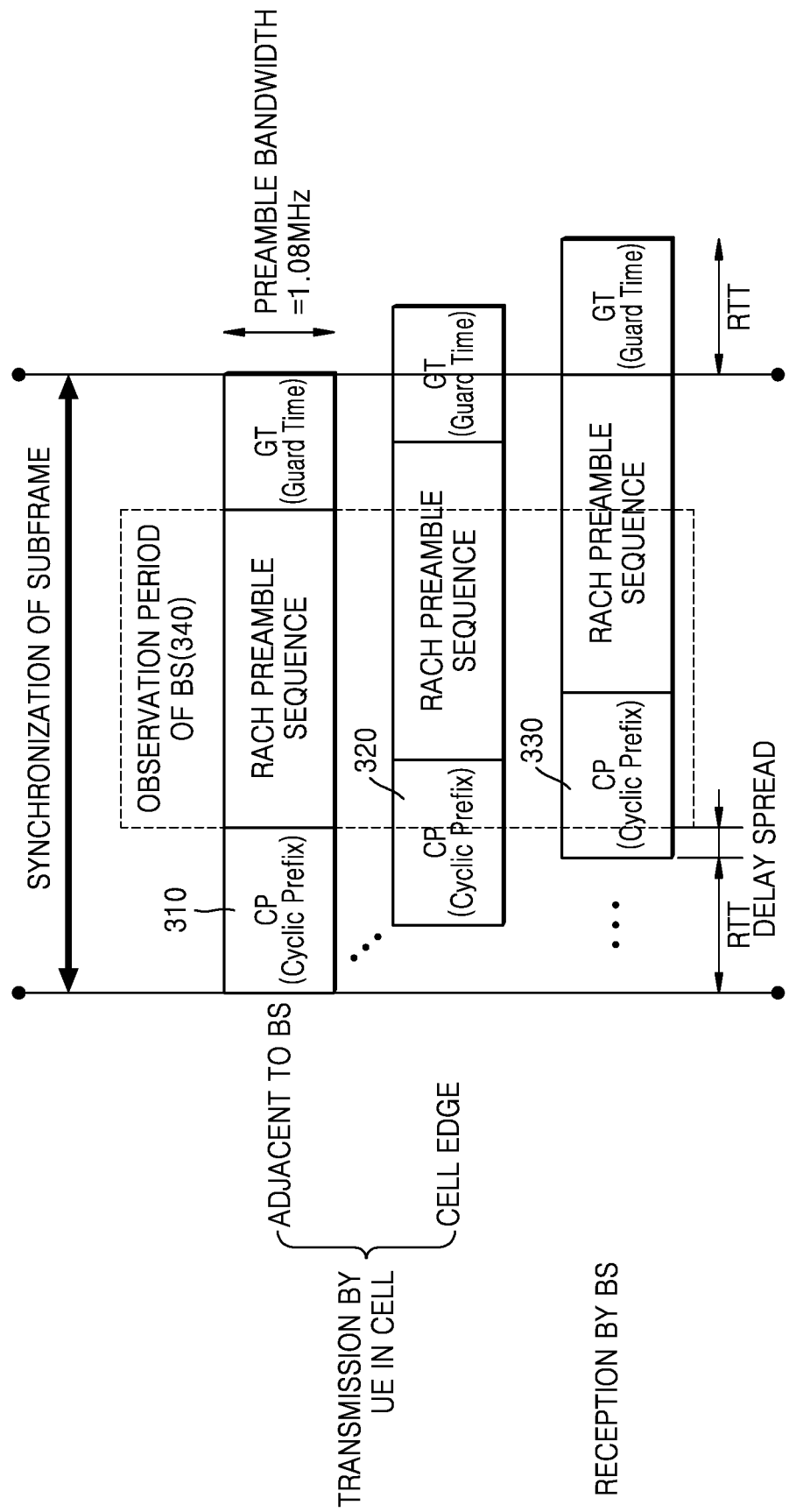
FIG. 3 is a diagram for describing a delay occurring in a random access signal received by the BS according to a distance between the UE and the BS.

FIG. 3 is a diagram for describing a delay occurring in a random access signal received by the BS according to a distance between the UE and the BS.

Referring to FIG. 3, the UE may receive a synchronization channel through a downlink, acquire a location of a subframe, and transmit a random access signal according to the acquired location of the subframe. In the present embodiment, a bandwidth of 1.08 MHz may be used to transmit the random access signal.

A random access signal 310 transmitted by a UE that is adjacent to a BS may be transmitted at a start point of a subframe, but a random access signal 320 transmitted by a UE that is located at a cell edge may be transmitted as late as a downlink delay time.

In addition, the BS may receive a random access signal 330 as late as a round trip delay (RTT) from a time point when a downlink signal is transmitted according to a distance to the UE. The CP included in the random access signal may serve to prevent inter-symbol interference (ISI) of the random access signal while the random access signal is transmitted from the UE to the BS through a multipath channel.

The BS may receive the random access signal transmitted from the UE during an observation period 340 and detect the received random access signal. In order for the random access signal to be detected during the observation period 340, a maximum cell radius has to satisfy a condition that the sum of a maximum RTT value and a delay spread time is less than the CP length. In addition, since the maximum RTT value does not act as interference in the next subframe when the maximum RTT value is less than or equal to the GT, the maximum RTT value may be calculated based on Equation 2 below.

$$\max \text{RTT} = \min(\text{CP length} - \text{delay spread}, \text{GT length}) \quad \text{[Equation 2]}$$

In Equation 2, maxRTT may represent the maximum RTT value and delay spread may represent the delay spread time.

The maximum cell radius according to the preamble format of the random access signal defined in the 3GPP standard may be calculated as shown in Table 2 below.

TABLE 2

Maximum cell radius supported by preamble of random access signal

| PRE-AMBLE FORMAT | T_CP (in Ts) | T_CP (in ms) | T_SEQ (in ms) | T_SEQ (in ms) | Total Length (in ms) | Number of Sub-frames | Guard Time (in ms) | Cell Radius |
|---|---|---|---|---|---|---|---|---|
| 0 | 3168 | 0.103 | 24576 | 0.800 | 0.903 | 1 | 0.097 | ~14 km |
| 1 | 21024 | 0.684 | 24576 | 0.800 | 1.484 | 2 | 0.516 | ~75 km |
| 2 | 6240 | 0.203 | 2 × 24576 | 1.600 | 1.803 | 2 | 0.197 | ~28 km |
| 3 | 1024 | 0.684 | 2 × 24576 | 1.600 | 2.284 | 3 | 0.716 | ~108 km |
| 4 | 448 | 0.015 | 4096 | 0.133 | 0.148 | | | |

It may be seen from Table 2 that the largest cell radius supported in the LTE is about 100 km in the case of using format 3, and the TA value for adjusting the transmission time point of the UE after detecting the random access signal is defined as up 1282 TA (=20512 Ts, Ts=1/30.72 MHz).

Figure 4:
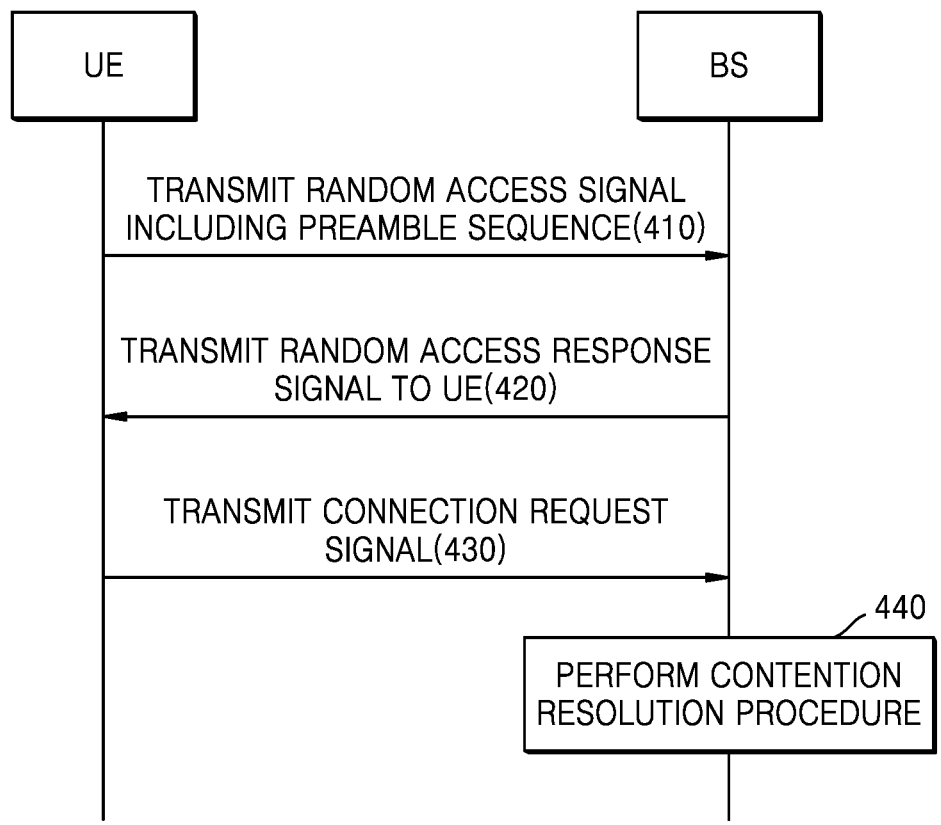
FIG. 4 is a flowchart for describing a synchronization process between a BS and a UE.

FIG. 4 is a flowchart for describing a synchronization process between a BS and a UE.

In operation 410, the UE may transmit, to the BS, a random access signal including the preamble sequence. The Zadoff-Chu sequence described above with reference to FIG. 2 may be used as the preamble sequence.

In step 420, the BS may transmit a random access response signal to the UE.

The BS may determine a TA value based on the random access response signal received from the UE. A method of determining the TA value, according to the embodiment, will be described below in more detail with reference to FIGS. 5 to 12.

The UE may transmit, to the BS, the random access response signal including the determined TA value, uplink grant information, the TA value, and temp cell radio network temporary identifier (CRNTI) information. However, this is merely an example, and information included in the random access response signal is not limited to the above-described example.

In operation 430, the UE may transmit a connection request signal to the BS. When the UE transmits a signal by using an uplink channel, the UE may transmit the signal at a time point that is corrected according to the TA value so that the UE is synchronized with the BS.

In operation 440, the BS may perform a contention resolution procedure. In case of contention based random access, the BS may perform a contention resolution procedure, such as transmission of an additional physical random access channel and reception of a physical downlink control channel and a physical downlink shared channel corresponding thereto.

Figure 5:
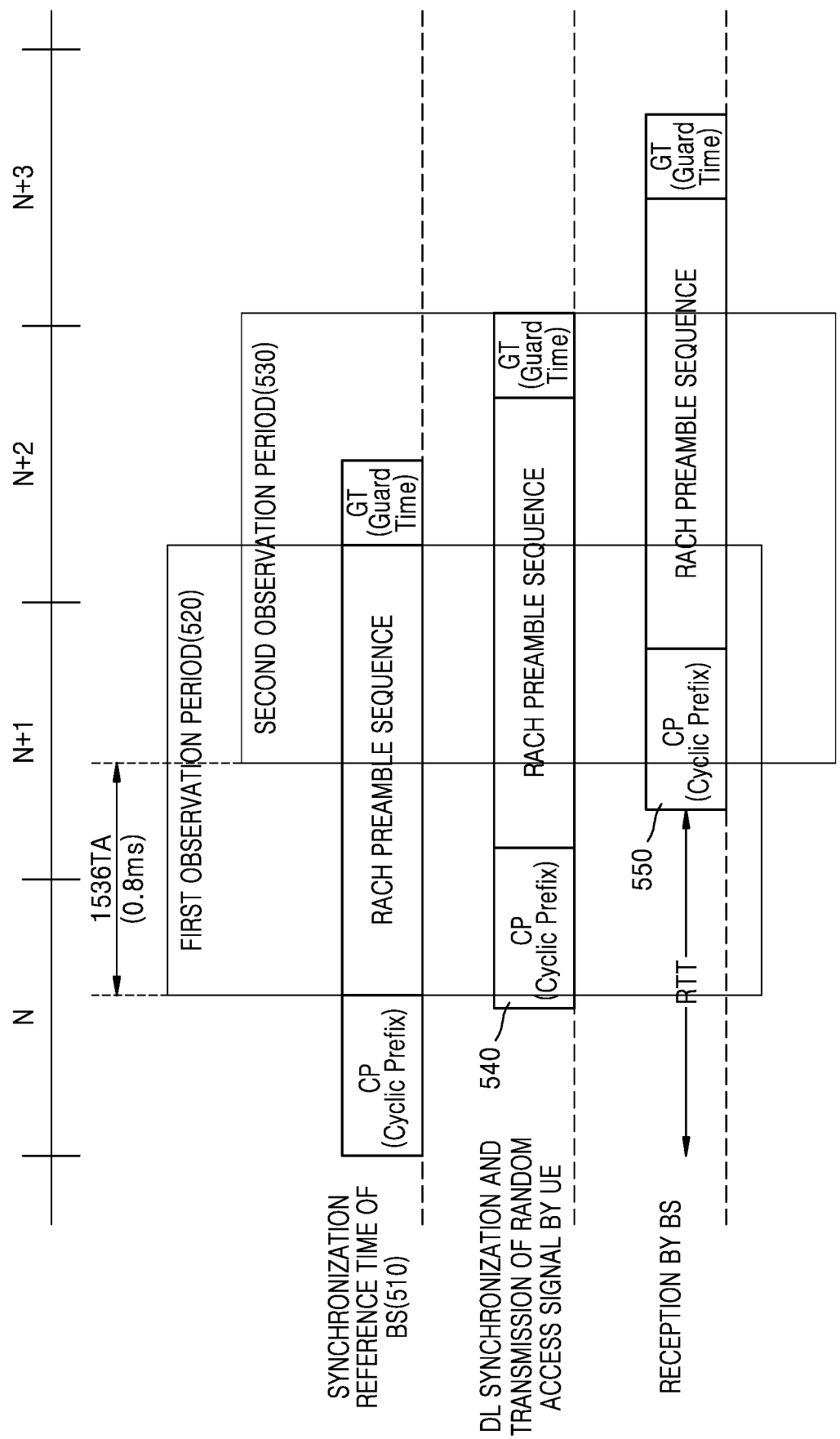
FIG. 5 is a diagram for describing a method, performed by a BS, of determining a timing advance (TA) value of a UE, according to an embodiment.

FIG. 5 is a diagram for describing a method, performed by a BS, of determining a TA value of a UE, according to an embodiment.

In FIG. 5, it is assumed that a BS receives, from a UE, a random access signal according to preamble format 3 supporting the largest cell radius in an LTE standard. In the preamble format 3, a sequence having a length of 2×24576 Ts may be used in the form of repeating a base sequence having a sequence length of 24576 Ts in a time domain. In addition, a CP may include a part having a length of 21024 Ts in the base sequence.

A general BS may detect a preamble by using a random access signal received in a first observation period 520 according to a synchronization reference time 510.

In order to support a wide area cell radius beyond a 100 km limit supported by the standard, the BS according to the embodiment may repeat a random access signal detection process by additionally setting an observation period, in addition to detecting a preamble and a timing offset in one observation period as before.

In FIG. 5, assuming that a UE located at a cell boundary with a radius of 200 km, which is twice the standard, attempts random access, a method of detecting a random access signal 540 transmitted by the UE by using two observation periods 520 and 530 will be described.

When a signal 550 received from a UE located at a cell boundary with a radius of 200 km is detected by using one observation period as before, the performance of detecting the random access signal may be degraded because the random access signal 540 transmitted by the UE is not completely received. In addition, due to ambiguity as much as 24576 Ts (=1536 TA=0.8 msec) corresponding to the length of the preamble sequence, an accurate time offset value may not be estimated. For example, a situation may occur in which a UE spaced 80 km away and a UE spaced 200 km away may not be identified by an estimated time offset value.

Therefore, the BS according to the embodiment may additionally set a second observation period so as to perform preamble sequence detection and timing offset estimation in a random access signal from an adjacent UE to a UE spaced 200 km away, without loss of performance due to loss of sample data in the received random access signal 550. The UE may perform the operation of transmitting the random access signal in the same manner as before without changing operations, and the BS may repeat the operation of detecting the received random access signal, thereby expanding a cell coverage area. However, since the BS detects the same random access signal twice, the BS may determine whether to select the signal received in the first observation period or the signal received in the second observation period, based on the random access signal acquired in each observation period.

After the timing offset estimation is completed, the BS may transmit, to the UE, a TA value indicating the timing offset value estimated in the random access response signal. The UE may perform uplink synchronization by advancing the transmission time point by the timing offset value included in the TA value and then transmitting the signal through the uplink channel.

However, since the range in which the TA value is indicated through the random access response signal is 1282 TA (=20512 Ts), it may be insufficient to cover a cell area of 100 km or more. In order to support the TA values exceeding the range without new control protocols, the BS according to the embodiment may store information about whether the TA value transmitted to each UE is generated in the first observation period or is generated in the second observation period. Therefore, the BS may support wide area cells by operating a scheduler and a modem.

For example, as illustrated in FIG. 5, the BS may determine the final TA value of the UE by using the two TA values measured in the first observation period 520 and the second observation period 530 at an interval of 1536 TA (=0.8 msec). In addition, the BS may determine whether the UE is located at a distance of 120 km or less or is located at a distance of greater than 120 km. When the BS determines that the UE is located at a distance of greater than 120 km, the BS may correct the determined final TA value according to a certain rule and transmit the corrected final TA value to the UE.

That is, the BS may transmit the TA value to the UE located at a distance of 120 km or less so that the UE is set to 0 TA, which is an uplink synchronization location from the viewpoint of the BS, and may transmit the TA value to the UE located at a distance of greater than 120 km so that the final TA value is converted into TA' (=measured TA−1536 TA) to set the uplink synchronization location to 1536 TA (=0.8 msec). However, since the TA value range provided through the random access response signal defined in the 3GPP standard is 1282 TA (=20512 Ts), the value of 1282 TA may be transmitted to the UE when the TA value is greater than 1282 TA.

In the case of the UE located at a distance of 120 km or less, the reference time point at which the BS processes the UL channel may be determined as a subframe boundary of 0 TA. In the case of the UE located at a distance of greater than 120 km, the reference time point at which the BS processes the UL channel may be determined as a subframe boundary of 1536 TA. The BS may process the signal received through the uplink channel according to the determined subframe boundary.

Figure 6:
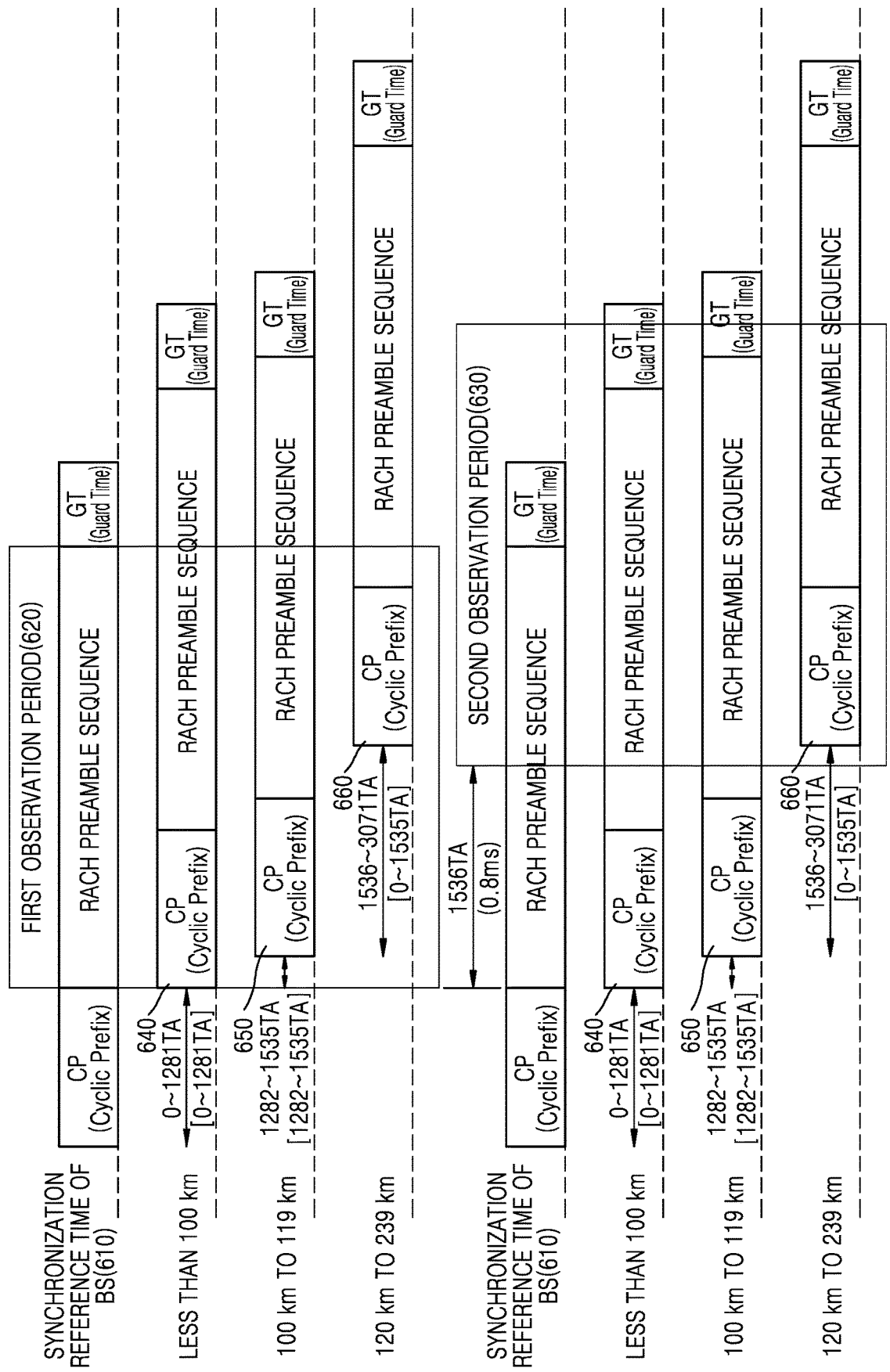
FIG. 6 is a diagram for describing random access signals that are detectable in a plurality of observation periods according to a distance between a BS and a UE.

FIG. 6 is a diagram for describing random access signals that are detectable in a plurality of observation periods according to a distance between a BS and a UE.

In FIG. 6, a case in which random access signals are detected by using two observation periods 620 and 630 in a cell environment having a cell radius of less than 240 km is assumed as an embodiment. When a cell radius of less than 240 km is assumed as a maximum delay time, a TA range that the BS has to actually detect with respect to a synchronization reference time 610 is 0 TA to 3071 TA. For example, a TA range of a random access signal 640 received from the UE located within a distance of 100 km may be 0 TA to 1281 TA, and a TA range of a random access signal 650 received from the UE located within a distance of 100 km to 119 km may be 1282 TA to 1535 TA. In addition, a TA range of a random access signal 660 received from the UE located within a distance of 120 km to 239 km may be 1536 TA to 3071 TA.

Since a length of a preamble sequence is 1536 TA, a range of a timing offset detected in each observation period may be 0 TA to 1535 TA.

Referring to FIG. 6, the timing offsets detected according to the distance between the BS and the UE in the first observation period 620 and the second observation period 630 may be confirmed. In the case of the first observation period 620, when the random access signals 640 and 650 of the UE located within a distance of 120 km are detected, the estimated timing offset value corresponds to a value of 0 TA to 1535 TA, and this is equal to an actual timing offset value. In the case of the second observation period 630, the BS may record a value of 0 TA to 1535 TA as the estimated timing offset value for the random access signal 660 of the UE located at a distance of 120 km to 239 km. In the case of the UE located at a distance of 120 km to 239 km, an offset may occur in a detection value because a start time of a subframe of the BS is delayed by 1536 TA.

The timing offset values detected for each distance in the first observation period 620 and the second observation period 630 may be determined as values shown in FIG. 6.

The BS according to the embodiment may select one of the TA values measured in the first observation period 620 and the second observation period 630. For example, the BS may select one of the TA values measured in the first observation period 620 and the second observation period 630, based on peak power or signal to noise power ratios (SNRs) measured in the first observation period 620 and the second observation period 630. The SNR in the first observation period 620 and the second observation period 630 will be described below in more detail with reference to FIG. 7.

Figure 7:
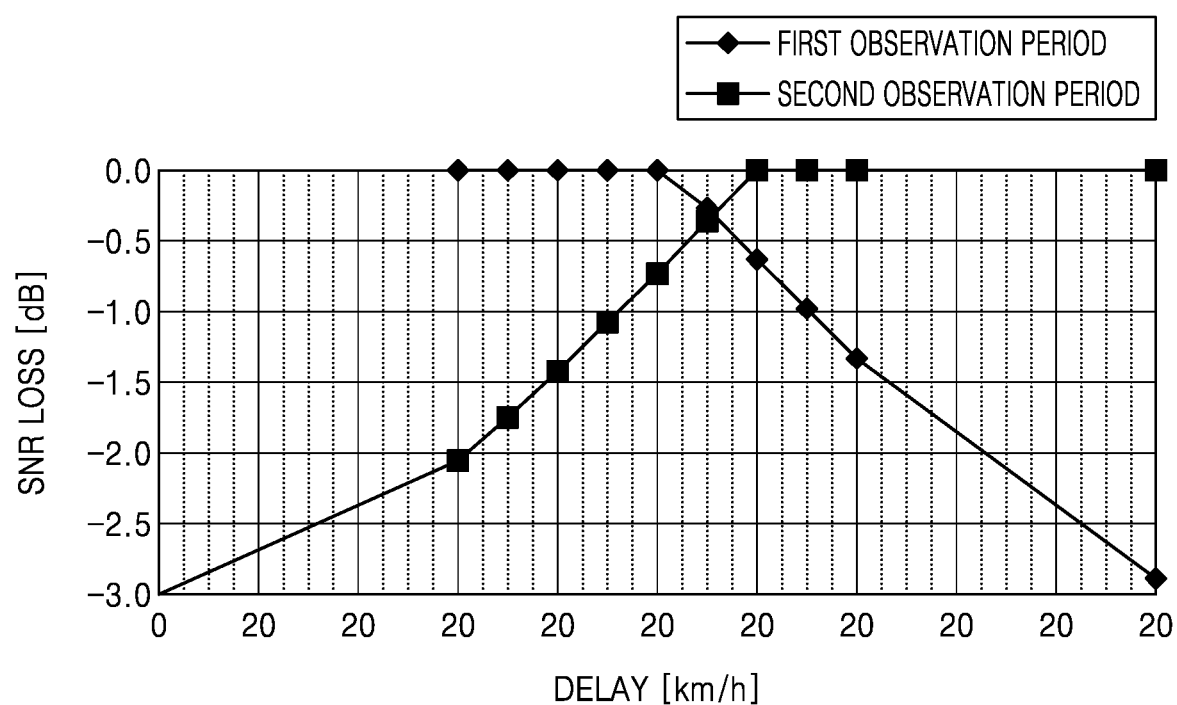
FIG. 7 is a graph showing signal to noise power ratios (SNRs) according to a location of a UE, the SNRs being measured by the BS in a first observation period and a second observation period.

FIG. 7 is a graph showing SNRs according to a location of a UE, the SNRs being measured by a BS in a first observation period and a second observation period.

Referring to FIG. 7, x and y axes of the graph represent a distance between the UE and the BS and an SNR, respectively. From the SNRs according to the distance between the UE and the BS in the first observation period and the second observation period, it may be confirmed that, in a range within 100 km, the preamble sequence is fully received in the first observation period, but only part of the preamble sequence is received in the second observation period.

Therefore, the peak power or the SNR measured in the first observation period may be greater than the peak power or the SNR measured in the second observation period. On the other hand, the preamble sequence of the UE located at a distance of 120 km or more is fully received in the second observation period, but only part of the preamble sequence is received in the first observation period. Therefore, it may be confirmed that the magnitude of the peak power or the SNR is reversed.

Figure 8:
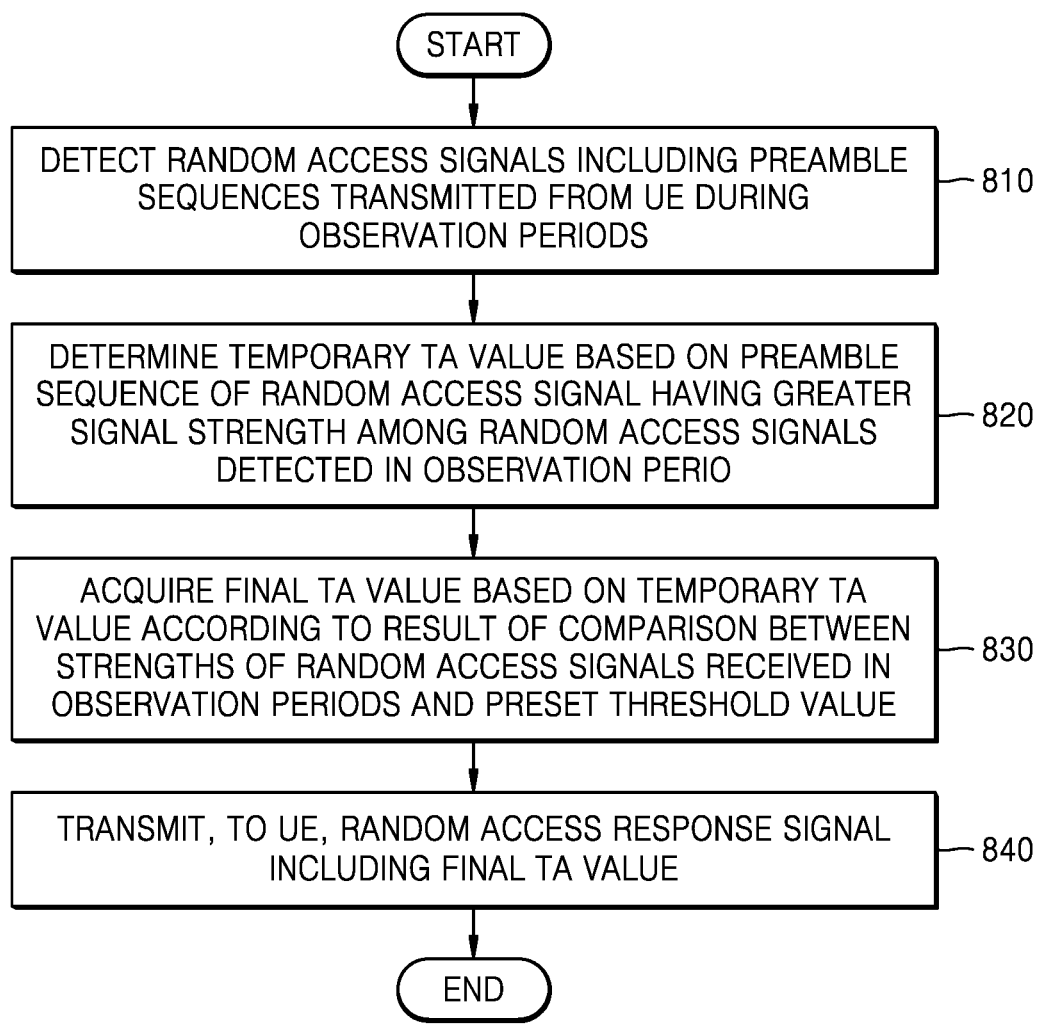
FIG. 8 is a flowchart for describing a method, performed by a BS, of providing a TA value determined based on a random access signal received from a UE, according to an embodiment.

FIG. 8 is a flowchart for describing a method of providing a TA value determined based on a random access signal that a BS receives from a UE, according to an embodiment.

In operation 810, the BS may detect random access signals including preamble sequences transmitted from the UE during a plurality of observation periods. For example, the BS may detect preamble sequences transmitted from the UE during a first observation period and a second observation period.

In operation 820, the BS may determine a temporary TA value based on a preamble sequence of a random access signal having greater signal strength among the random access signals detected in the observation periods.

The BS may determine, as a temporary TA value, a TA value of an observation period in which a larger random access signal is received among the TA values acquired based on the random access signals received in the observation periods.

This is merely an embodiment. According to another embodiment, the BS may compare the strengths of the received signals of the observation periods based on the random access signals received during partial periods in the observation periods.

In addition, according to another embodiment, the BS may determine a temporary TA value based on a random access signal received in a period overlapping the observation periods.

In operation 830, the BS may acquire a final TA value based on the temporary TA value according to a result of comparison between the strengths of the random access signals received in the observation periods and a preset threshold value. For example, the BS may determine whether a ratio of the signal strength in the first observation period to the signal strength in the second observation period is greater than or equal to the preset threshold value.

This will be described below in more detail with reference to FIG. 9.

In operation 840, the BS may transmit, to the UE, a random access response signal including the final TA value.

In order to support the TA values exceeding the range without new control protocols, the BS according to the embodiment may store information about whether the TA value transmitted to each UE is generated in the first observation period or is generated in the second observation period. For example, the BS may determine whether the UE is located at a distance of 120 km or less or is located at a distance of greater than 120 km. When the BS determines that the UE is located at a distance of greater than 120 km, the BS may correct the determined final TA value according to a certain rule and transmit the corrected final TA value to the UE. A specific embodiment in which the BS corrects the final TA value will be described below with reference to FIG. 10.

Figure 9:
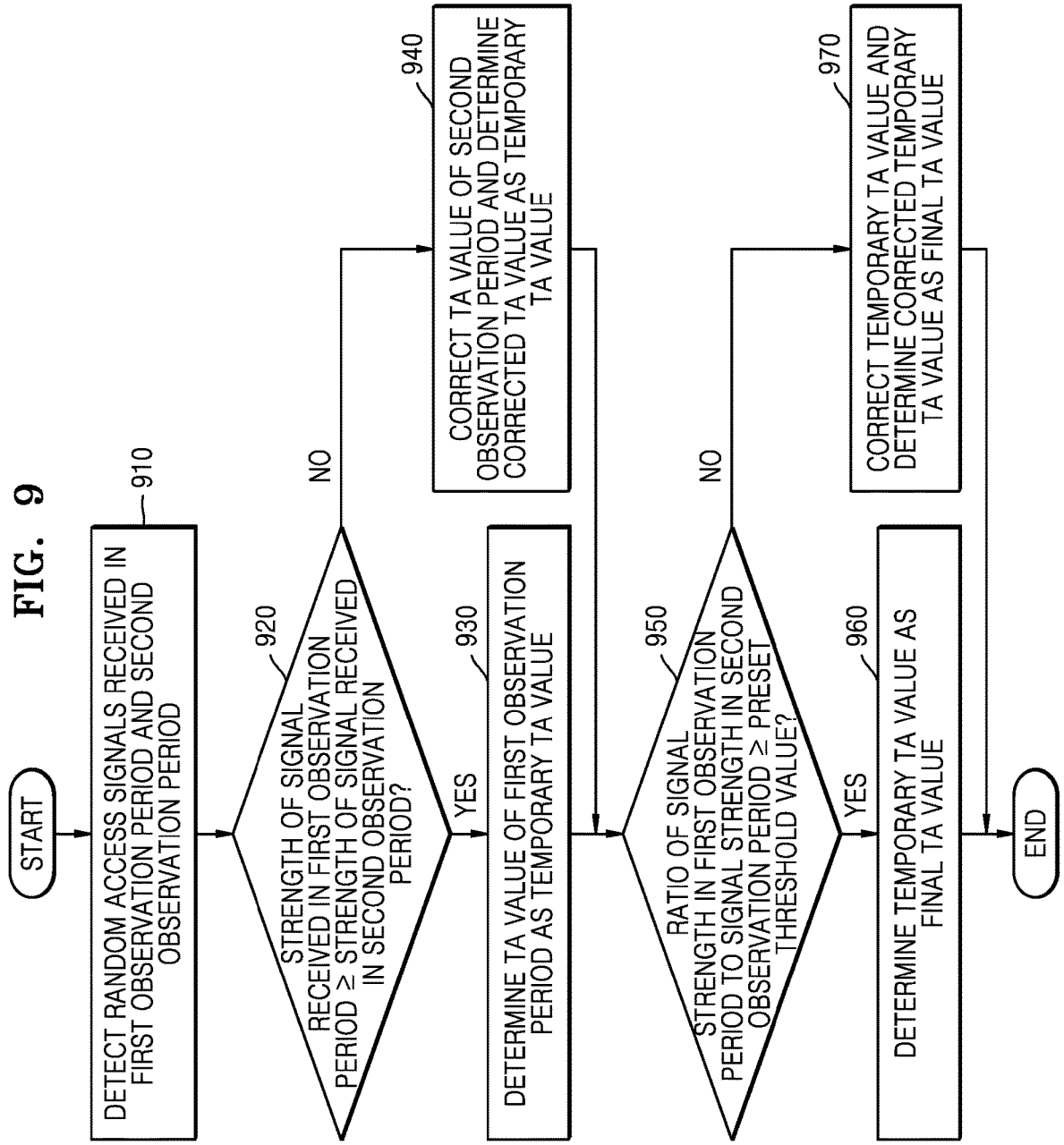
FIG. 9 is a detailed flowchart for describing a method, performed by a BS, of determining a TA value based on a random access signal received from a UE, according to an embodiment.

FIG. 9 is a detailed flowchart for describing a method of determining a TA value based on a random access signal that a BS receives from a UE, according to an embodiment.

In operation 910, the BS may detect random access signals received in a first observation period and a second observation period. The BS according to the embodiment may determine a TA value for the first observation period based on the random access signal received in the first observation period and may determine a TA value for the second observation period based on the random access signal received in the second observation period.

In operation 920, the BS may determine whether the strength of the signal received in the first observation period is greater than or equal to the strength of the signal received in the second observation period.

In operation 930, when the strength of the signal received in the first observation period is greater than or equal to the strength of the signal received in the second observation period, the BS may determine the TA value of the first observation period as a temporary TA value.

In operation 940, when the strength of the signal received in the first observation period is less than the strength of the signal received in the second observation period, the BS may correct the TA value of the second observation period and determine the corrected TA value as a temporary TA value.

When the TA value of the second observation period is selected, the BS according to the embodiment may correct the TA value of the second observation period according to Equation 3 below.

$$\text{Corrected TA} = \text{mod}(\text{Diff TA} + B, 1536) \qquad \text{[Equation 3]}$$

In Equation 3, mod may represent a modulation operation and Diff TA may represent a time difference between the first observation period and the second observation period. In addition, B refers to a TA value estimated in the second observation period.

In operation 950, the BS may determine whether a ratio of signal strength in the first observation period to signal strength in the second observation period is greater than or equal to a preset threshold value. The threshold value may be determined by one of a plurality of threshold values preset according to peak powers or SNRs of the signals in the first observation period and the second observation period. In addition, a plurality of threshold values may be preset by using statistical specification of the strength ratio of the received signals according to the location of the UE.

The BS according to the embodiment may determine whether to correct the temporary TA value by additionally comparing the signal strength ratio between the first observation period and the second observation period with the threshold value. The BS may determine whether to correct and use the offset of 1536 TA corresponding to 120 km, thereby solving ambiguity for the offset estimation value exceeding 1536 TA.

In operation 960, when the ratio of the signal strength in the first observation period to the signal strength in the second observation period is greater than or equal to the preset threshold value, the BS may determine the temporary TA value as a final TA value.

In operation 970, when the ratio of the signal strength in the first observation period to the signal strength in the second observation period is less than the preset threshold value, the BS may correct the temporary TA value and determine the corrected temporary TA value as the final TA value. For example, the BS may acquire the final TA value by adding 1536 TA to the temporary TA value.

Figure 10:
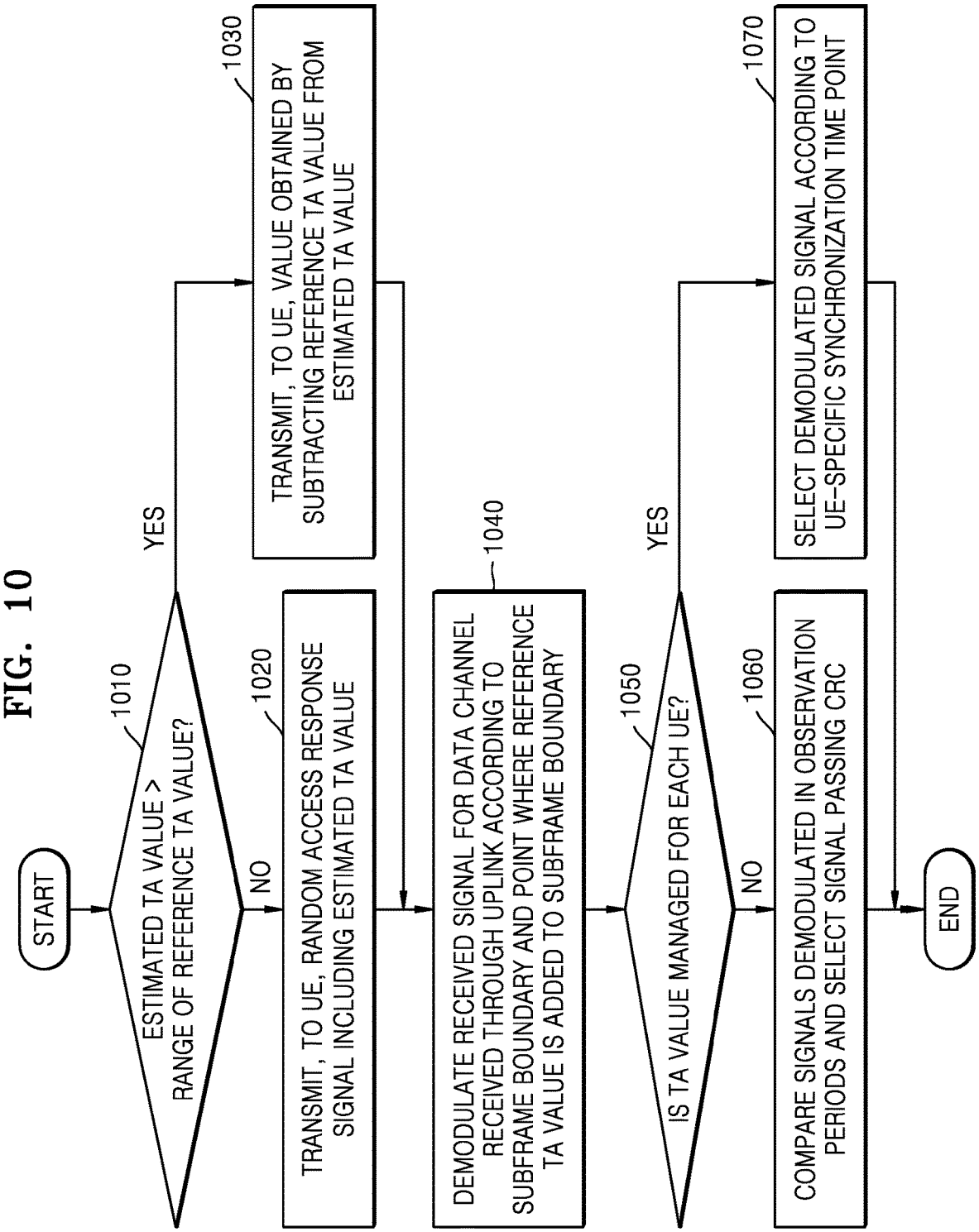
FIG. 10 is a flowchart for describing a method, performed by a BS, of performing uplink synchronization by providing an estimated TA value to a UE, according to an embodiment.

FIG. 10 is a flowchart for describing a method, performed by a BS, of performing uplink synchronization by providing an estimated TA value to a UE, according to an embodiment.

In operation 1010, the BS may determine whether the estimated TA value exceeds a range of a reference TA value. As described above, the range that allows the TA value to be provided from the BS to the UE through the random access response signal may be limited to 1282 TA (=20512 Ts).

Therefore, the BS may determine whether the estimated TA value is within the range of the reference TA value and may process the TA value to be provided to the UE.

In operation 1020, when the estimated TA value does not exceed the range of the reference TA value, the BS may transmit, to the UE, the random access response signal including the estimated TA value. However, when the estimated TA value exceeds 1282 TA set in the standard, the estimated TA value may be adjusted to 1282 TA and then transmitted.

In operation 1030, when the estimated TA value exceeds the range of the reference TA value, the BS may transmit, to the UE, a value obtained by subtracting the reference TA value from the estimated TA value. The reference TA value represents a TA value corresponding to a time difference between the first observation period and the second observation period. However, when the value obtained by subtracting the reference TA value from the estimated TA value exceeds 1282 TA set in the specification, the estimated TA value may be adjusted to 1282 TA and then transmitted.

In operation 1040, the BS may demodulate a received signal for a data channel received through an uplink according to a subframe boundary and a point where the reference TA value corresponding to the time difference between the first observation period and the second observation period is added to the subframe boundary. That is, the BS may demodulate a received signal twice according to the subframe boundary and the point where the reference TA value corresponding to the time difference between the first observation period and the second observation period is added to the subframe boundary.

In operation 1050, the BS may determine whether the TA value is managed for each UE.

In operation 1060, when the TA value is not managed for each UE, the BS may compare the signals demodulated in the observation periods and select a signal passing a cyclic redundancy check (CRC). The BS may determine the signal passing the CRC as a signal normally transmitted by the UE. The BS may perform medium access control (MAC) processing on the selected signal.

In operation 1070, when the TA value is managed for each UE, the BS may select a demodulated signal according to a UE-specific synchronization time point. The BS may perform MAC processing on the selected signal.

Figure 11:
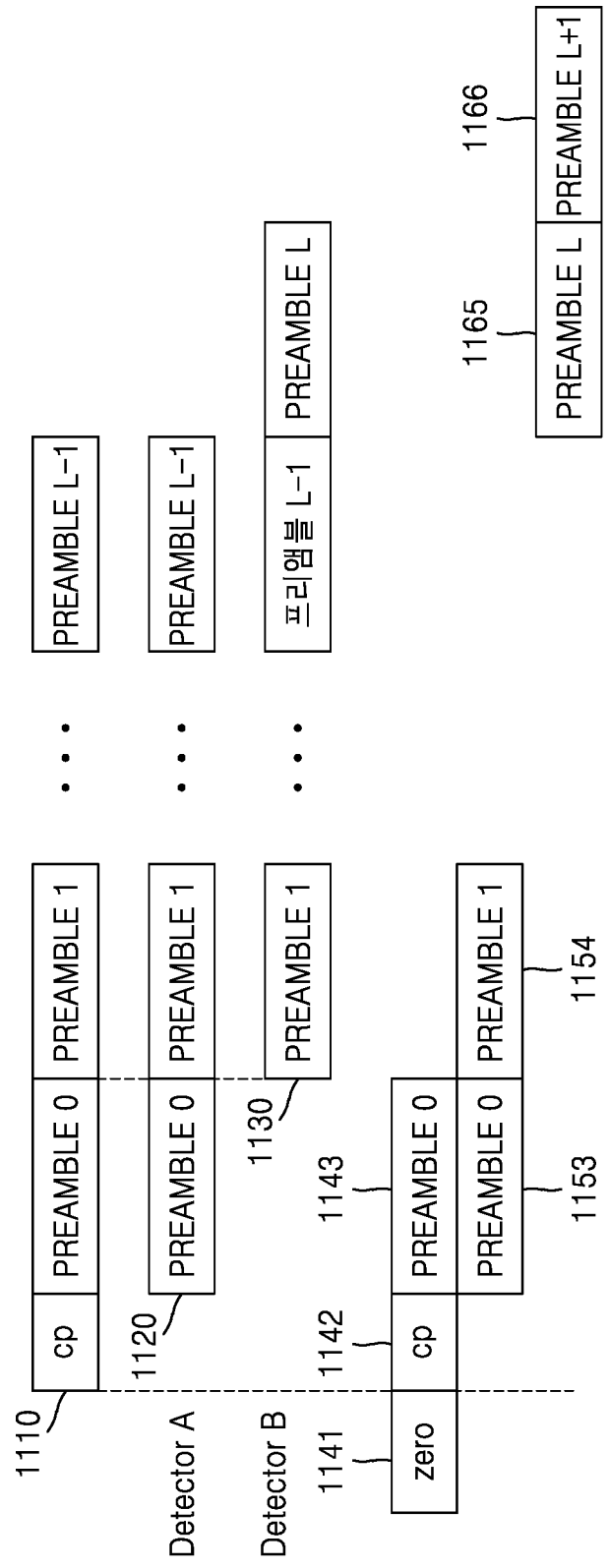
FIG. 11 is a flowchart for describing a method, performed by a BS, of performing uplink synchronization by providing an estimated TA value to a UE, according to another embodiment.

FIG. 11 is a flowchart for describing a method, performed by a BS, of performing uplink synchronization by providing an estimated TA value to a UE, according to another embodiment.

In FIG. 11, it is assumed that a length of a preamble of a random access signal 1110 is L.

The BS according to the embodiment may determine a temporary TA value based on a random access signal received in a period overlapping a plurality of observation periods 1120 and 1130. For example, the BS may detect random access signals received during a first observation period 1120 and a second observation period 1130. The BS may determine the temporary TA value by using preamble 1 to preamble L−1, which are random access signals overlapped in the first observation period 1120 and the second observation period 1130, respectively.

When the BS determines the temporary TA value based on the random access signal received in the period overlapping the observation periods 1120 and 1130, the BS may omit operations 910 and 920 described above with reference to FIG. 9.

In addition, the BS according to the embodiment may compare the strengths of the received signals of the observation periods based on the random access signals received during partial periods in the observation periods.

For example, when the BS acquires the strength of the signal of the first observation period 1120, the BS may use the sum of the strengths of the signals received in a CP interval 1142 and a preamble 0 interval 1143 or a preamble 0 interval 1153 and a preamble 1 interval 1154. In addition, when the strength of the signal of the second observation period 1130, the BS may use the sum of the strengths of the signals received in a preamble L interval 1165 and a preamble L+1 interval 1166.

The above-described example is merely an example of using the sum of the strengths of the received signals in the two preamble intervals, and the number of preamble intervals used for the comparison of signal strength is not limited thereto. According to another example, the sum of the strengths of signals of N preamble intervals may be used for the comparison of signal strengths.

Figure 12:
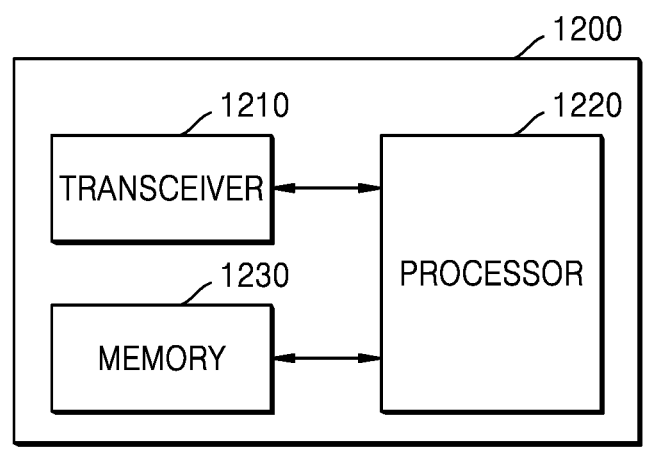
FIG. 12 is a block diagram of a BS according to an embodiment.

FIG. 12 is a block diagram of a BS 1200 according to an embodiment.

Referring to FIG. 12, the BS 1200 may include a transceiver 1210, a processor 1220, and a memory 1230. The transceiver 1210, the processor 1220 and the memory 1230 may operate according to the bandwidth adjustment method of the BS proposed in the above embodiments. However, the elements of the BS 1200 according to the embodiment are not limited to the above-described example. According to another embodiment, the BS 1200 may include more elements or fewer elements than the above-described elements. In a particular case, the transceiver 1210, the processor 1220, and the memory 1230 may be implemented in the form of a single chip.

The transceiver 1210 may transmit and receive a signal to and from a UE. The signal may include control information and data. To this end, the transceiver 1210 may include an RF transmitter that performs up-conversion and amplification on a frequency of a signal to be transmitted, and an RF receiver that performs low-noise amplification on a received signal and performs down-conversion on a frequency of the received signal. However, this is merely an embodiment, and the elements of the transceiver 1210 are not limited to the RF transmitter and the RF receiver.

In addition, the transceiver 1210 may receive a signal through a radio channel, output the received signal to the processor 1220, and transmit an output signal of the processor 1220 through the radio channel. For example, the transceiver 1210 may receive a random access signal transmitted from the UE during a plurality of observation periods.

The processor 1220 may control a series of processes so that the BS 1200 operates according to the above-described embodiment of the present disclosure. For example, the processor 1220 may perform at least one signal transmission and reception method according to the above-described embodiments.

For example, the processor 1220 may detect random access signals including preamble sequences transmitted from the UE during a plurality of observation periods. In addition, the processor 1220 may determine a temporary TA value based on a preamble sequence of a random access signal having greater signal strength among the random access signals detected in the observation periods. The processor 1220 may acquire a final TA value based on the temporary TA value according to a result of comparison between the strengths of the random access signals received in the observation periods and a preset threshold value.

Thereafter, the transceiver 1210 may transmit, to the UE, a random access response signal including the TA value determined by the processor 1220.

The memory 1230 may store control information or data included in a signal acquired by the BS 1200 and may have an area for storing data necessary for the control of the processor 1220, data generated during the control of the processor 1220, and the like. For example, the memory 1230 may store at least one of a temporary TA value and a final TA value of the UE.

The memory 1230 may be configured in various forms, such as read-only memory (ROM), random access memory (RAM), hard disk, compact disc read-only memory (CD-ROM), and/or digital versatile disc (DVD).

The embodiments of the present disclosure, which are described in the specification and drawings, are merely presented as specific examples so as to easily explain the technical contents of the present disclosure and help the understanding of the present disclosure and are not intended to limit the scope of the present disclosure.

That is, it will be obvious to those of ordinary skill in the art that other modifications based on the technical idea of the present disclosure may be made. In addition, the embodiments are divided for convenience of description and may be combined and operated as necessary. For example, parts of the embodiments of the present disclosure may be combined with each other so that the BS and the UE may operate.

The invention claimed is:

1. A method, performed by a base station (BS), of transmitting and receiving signals in a wireless communication system, the method comprising:
    detecting random access signals including preamble sequences transmitted from a user equipment (UE) during a plurality of observation periods;
    determining a temporary timing advance (TA) value based on a preamble sequence of a random access signal having greater signal strength among the plurality of random access signals detected in the plurality of observation periods;
    acquiring a final TA value based on the temporary TA value according to a result of comparison between the strengths of the random access signals received in the plurality of observation periods and a preset threshold value; and
    transmitting, to the UE, a random access response signal including the final TA value.

2. The method of claim 1, further comprising comparing the strengths of the random access signals received in the plurality of observation periods.

3. The method of claim 1, wherein the determining of the temporary TA value comprises:
    when a strength of a random access signal received in a first observation period among the plurality of observation periods is greater than or equal to a strength of a random access signal received in a second observation period, determining, as the temporary TA value, a TA value determined based on the random access signal received in the first observation period; and
    when the strength of the random access signal received in the first observation period is less than the strength of the random access signal received in the second observation period, determining the temporary TA value by correcting a TA value determined based on the random access signal received in the second observation period, based on a time difference between the first observation period and the second observation period and a length of the preamble sequence.

4. The method of claim 3, wherein the acquiring of the final TA value comprises:
    when a ratio of a strength of the random access signal in the first observation period to a strength of the random access signal in the second observation period is greater than or equal to the preset threshold value, acquiring the temporary TA value as the final TA value; and
    when the ratio of the strength of the random access signal in the first observation period to the strength of the random access signal in the second observation period is less than the preset threshold value, acquiring the final TA value by correcting the temporary TA value by using the length of the preamble sequence.

5. The method of claim 1, wherein the preset threshold value is set according to a ratio of the strengths of the random access signals received in the plurality of observation periods.

6. The method of claim 1, wherein the transmitting comprises:
    when the final TA value exceeds a reference TA value preset based on a time difference between the plurality of observation periods, transmitting a difference value between the final TA value and the reference TA value to the UE as the final TA value; and
    when the final TA value is less than or equal to the reference TA value, transmitting the final TA value to the UE.

7. The method of claim 6, further comprising:
- determining a synchronization time point, at which a signal received from the UE is demodulated after the transmitting of the final TA value, based on a strength difference between the final TA value and the reference TA value; and
- demodulating the signal received from the UE after the transmitting of the final TA value, based on the determined synchronization time point.

8. A base station (BS) for transmitting and receiving signals in a wireless communication system, the BS comprising:
- at least one processor configured to detect random access signals including preamble sequences transmitted from a user equipment (UE) during a plurality of observation periods, determine a temporary timing advance (TA) value based on a preamble sequence of a random access signal having greater signal strength among the plurality of random access signals detected in the plurality of observation periods, and acquire a final TA value based on the temporary TA value according to a result of comparison between the strengths of the random access signals received in the plurality of observation periods and a preset threshold value;
- a transceiver configured to transmit, to the UE, a random access response signal including the final TA value; and
- a memory configured to store the temporary TA value and the final TA value.

9. The BS of claim 8, wherein the at least one processor is further configured to compare the strengths of the random access signals received in the plurality of observation periods.

10. The BS of claim 8, wherein the at least one processor is further configured to:
- when a strength of a random access signal received in a first observation period among the plurality of observation periods is greater than or equal to a strength of a random access signal received in a second observation period, determine, as the temporary TA value, a TA value determined based on the random access signal received in the first observation period; and
- when the strength of the random access signal received in the first observation period is less than the strength of the random access signal received in the second observation period, determine the temporary TA value by correcting a TA value determined based on the random access signal received in the second observation period, based on a time difference between the first observation period and the second observation period and a length of the preamble sequence.

11. The BS of claim 10, wherein the at least one processor is further configured to:
- when a ratio of a strength of the random access signal in the first observation period to a strength of the random access signal in the second observation period is greater than or equal to the preset threshold value, acquire the temporary TA value as the final TA value; and
- when the ratio of the strength of the random access signal in the first observation period to the strength of the random access signal in the second observation period is less than the preset threshold value, acquire the final TA value by correcting the temporary TA value by using the length of the preamble sequence.

12. The BS of claim 8, wherein the preset threshold value is set according to a ratio of the strengths of the random access signals received in the plurality of observation periods.

13. The BS of claim 8, wherein the transceiver is further configured to:
- when the final TA value exceeds a reference TA value preset based on a time difference between the plurality of observation periods, transmit a difference value between the final TA value and the reference TA value to the UE as the final TA value; and
- when the final TA value is less than or equal to the reference TA value, transmit the final TA value to the UE.

14. The BS of claim 13, wherein the at least one processor is further configured to determine a synchronization time point, at which a signal received from the UE is demodulated after the transmitting of the final TA value, based on a strength difference between the final TA value and the reference TA value, and demodulate the signal received from the UE after the transmitting of the final TA value, based on the determined synchronization time point.

15. A non-transitory computer-readable recording medium having recorded thereon a program for executing the method of claim 1 on a computer.

* * * * *